United States Patent
Liu et al.

(10) Patent No.: US 11,411,493 B2
(45) Date of Patent: Aug. 9, 2022

(54) TWO-STAGE POWER CONVERTER (71) Applicant: Richtek Technology Corporation, Zhubei (TW)

(72) Inventors: Kuo-Chi Liu, Hsinchu (TW); Ta-Yung Yang, Taoyuan (TW); Chung-Lung Pai, Hsinchu (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 0 days.

(21) Appl. No.: 17/319,728

(22) Filed: May 13, 2021

(65) Prior Publication Data

US 2021/0384820 A1 Dec. 9, 2021

Related U.S. Application Data (60) Provisional application No. 63/036,407, filed on Jun. 8, 2020.

(30) Foreign Application Priority Data

Nov. 5, 2020 (TW) .................................. 109138675

(51) Int. Cl.
*H02M 3/07* (2006.01)
*G06F 1/26* (2006.01)
*H02M 1/08* (2006.01)

(52) U.S. Cl.
CPC ................ *H02M 3/07* (2013.01); *G06F 1/26* (2013.01); *H02M 1/083* (2013.01)

(58) Field of Classification Search
None
See application file for complete search history.

(56) References Cited

U.S. PATENT DOCUMENTS

| 8,351,228 B2* | 1/2013 | Izumi | H02M 3/07 363/60 |
| 11,165,335 B2* | 11/2021 | Sblano | H02M 3/158 |
| 2011/0175591 A1* | 7/2011 | Cuk | H02M 3/158 323/311 |
| 2021/0367520 A1* | 11/2021 | Liu | H02M 1/0025 |

* cited by examiner

*Primary Examiner* — Jeffery S Zweizig
(74) *Attorney, Agent, or Firm* — Tung & Associates (57) ABSTRACT

A two-stage power converter includes: a resonant switched-capacitor converter (RSCC) receiving an input voltage and generating a first stage voltage; a voltage regulator receiving the first stage voltage and generating an output voltage; and a communication interface and control circuit generating a charging operation signal, at least one discharging operation signal and a switching signal. The charging operation signal and the discharging operation signal are employed to control the RSCC to perform a charging process and at least one discharging process respectively, and the switching signal is employed to control the voltage regulator, so as to synchronize a resonant frequency of the RSCC and a switching frequency of the voltage regulator. The communication interface and control circuit adjusts a delay interval after the discharging process ends, and starts the charging process at an end time point of the delay interval.

14 Claims, 9 Drawing Sheets

TWO-STAGE POWER CONVERTER

CROSS REFERENCE

The present invention claims priority to U.S. 63/036,407 filed on Jun. 8, 2020 and claims priority to TW 109138675 filed on Nov. 5, 2020.

BACKGROUND OF THE INVENTION

Field of Invention

The present invention relates to a two-stage power converter, and particularly to a two-stage power converter with synchronized switching frequency.

Description of Related Art

Figure 1:
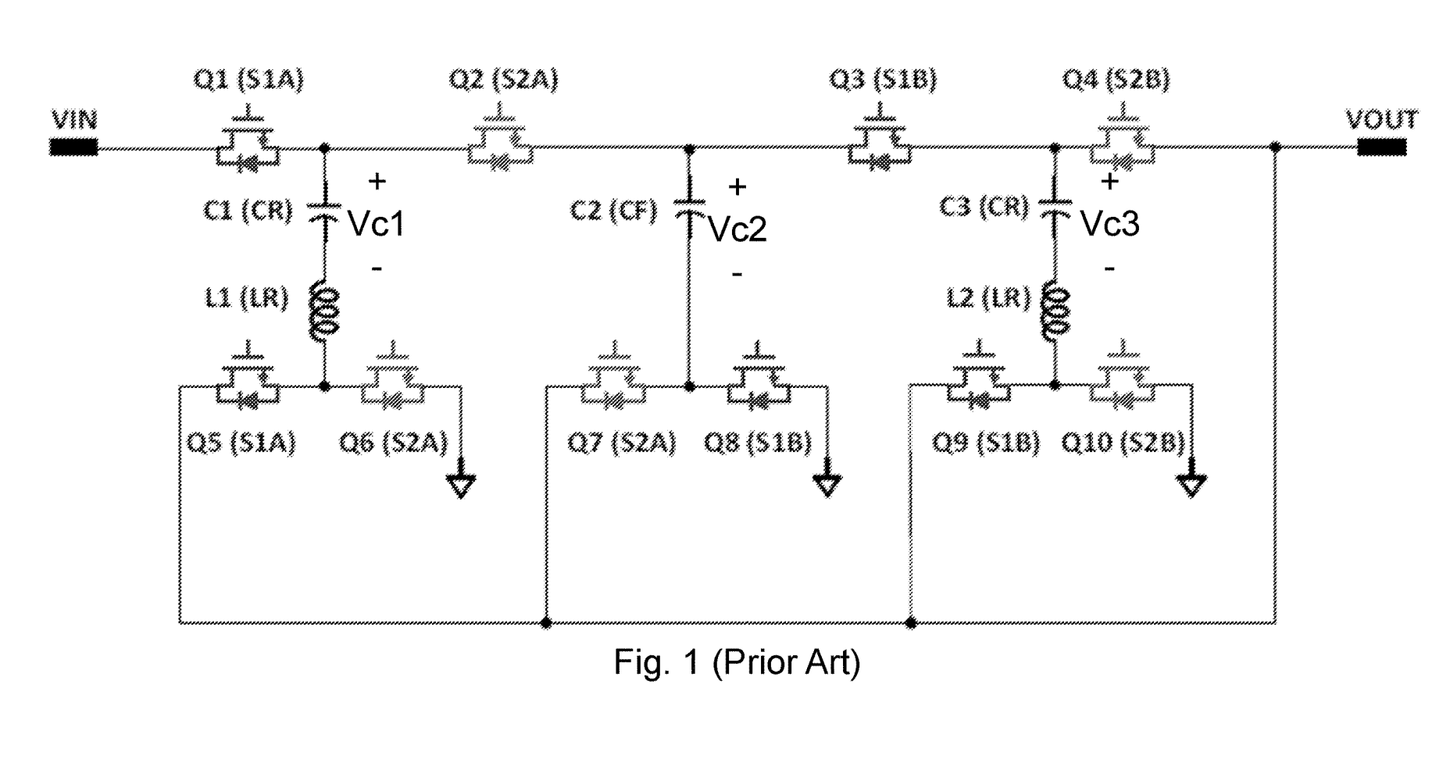
FIG. 1 illustrates a schematic diagram of a conventional power converter.

Please refer to FIG. 1, which shows a schematic diagram of a conventional power converter. Under a charging operation, switches Q1, Q3, Q5, Q8 and Q9 are ON, whereas, switches Q2, Q4, Q6, Q7 and Q10 are OFF, so that a series connection of a capacitor C1 and an inductor L1 is formed between an input voltage VIN and an output voltage VOUT and a series connection of a capacitor C2, a capacitor C3 and an inductor L2 is formed between a ground voltage level and the output voltage VOUT. On the other hand, under a discharging operation, switches Q2, Q4, Q6, Q7 and Q10 are ON, whereas, switches Q1, Q3, Q5, Q8 and Q9 are OFF, so that a series connection of the inductor L1, the capacitor C1 and the capacitor C2 is formed between the ground voltage level and the output voltage VOUT and a series connection of the inductor L2 and the capacitor C3 is formed between the ground voltage level and the output voltage VOUT. It is required for the capacitors of this conventional power converter to withstand a relatively higher rated voltage. It is required for the capacitors of this conventional power converter to withstand a relatively higher rated voltage. For example, the DC bias voltage of the capacitor C1 is three times the level of the output voltage VOUT (i.e., Vc1=3VOUT); the DC bias voltage of the capacitor C2 is two times the level of the output voltage VOUT (i.e., Vc2=2VOUT); the DC bias voltage of the capacitor C3 is equal to the level of the output voltage VOUT (i.e., Vc3=VOUT). Because the required DC bias voltage levels of the capacitors are relatively higher, it is required for this conventional power converter to utilize capacitors having a larger size. Additionally, the capacitance of a capacitor usually decreases as its DC bias voltage increases. In a case where a level of the input voltage VIN ranges between 36V and 76V, the DC bias voltage level of the capacitor C1 will range between 27V and 57V. The wide variation range of the DC bias voltage level leads to the wide variation range of the capacitance of the capacitor; as a result, the resonant frequency of this conventional power converter will vary greatly, resulting in a larger switching power loss, and a complicated control mechanism is required for better power conversion efficiency, but still within its constraints. Moreover, the voltage conversion ratio of the input voltage to the output voltage of this conventional power converter is limited to be 4:1 or 2:1; that is, this conventional power converter cannot perform voltage conversion of other voltage conversion ratios, such as 3:1.

In view of the above, to overcome the drawbacks in the prior art, the present invention proposes an innovated power converter.

SUMMARY OF THE INVENTION

In one aspect, the present invention provides a two-stage power converter, which is configured to operably convert an input voltage to an output voltage, the two-stage power converter including: a resonant switched-capacitor converter (RSCC) configured to operably receive the input voltage and generate a first stage voltage; a voltage regulator configured to operably receive the first stage voltage and generate the output voltage; and a communication interface and control circuit configured to operably generate a charging operation signal, at least one discharging operation signal and a switching signal, wherein the charging operation signal and the at least one discharging operation signal are employed to control the RSCC, and the switching signal is employed to control the voltage regulator, so as to synchronize a resonant frequency of the RSCC and a switching frequency of the voltage regulator; wherein the RSCC includes: a plurality of capacitors; a plurality of switches coupled to the plurality of capacitors, the plurality of switches respectively switch electrical connections of the plurality of capacitors according to the corresponding charging operation signal or the corresponding discharging operation signal; at least one charging inductor connected in series to at least one of the plurality of capacitors; and at least one discharging inductor connected in series to at least one of the plurality of capacitors; wherein the charging operation signal and the at least one discharging operation signal have respective ON periods which do not overlap with one another, such that a charging process and at least one discharging process do not overlap with one another; wherein in the charging process, the switches are controlled by the charging operation signal such that a series connection of the plurality of capacitors and the at least one charging inductor is formed between the input voltage and the first stage voltage, which forms a charging path; wherein in the at least one discharging process, the switches are controlled by the at least one discharging operation signal such that each of the capacitors and a corresponding one of the at least one discharging inductor form a series connection between the first stage voltage and a ground voltage level, whereby a plurality of discharging paths are formed at a same time or in alternating order; wherein the charging process and the at least one discharging process are arranged in a repeated, alternating manner, so as to convert the input voltage to the first stage voltage; wherein the communication interface and control circuit adjusts a delay interval after the at least one discharging process ends, and starts the charging process at an end time point of the delay interval, wherein the plurality of switches are OFF during the delay interval.

In one embodiment, the communication interface and control circuit adjusts the delay interval, so as to adjust the resonant frequency of the RSCC.

In one embodiment, the two-stage power converter may further include a power supply unit configured to operably provide the input voltage.

In one embodiment, the output voltage is employed to supply power to a central processing unit, a graphics processing unit or a memory unit, and the communication interface and control circuit adjusts the charging operation signal, the at least one discharging operation signal and the switching signal, so as to adjust a ratio of the input voltage to the first stage voltage.

In one embodiment, the at least one charging inductor is one single charging inductor, and the at least one discharging inductor is one single discharging inductor.

In one embodiment, an inductance of the single charging inductor is equal to an inductance of the single discharging inductor.

In one embodiment, the at least one charging inductor and the at least one discharging inductor are one same single inductor.

In one embodiment, the same single inductor is a variable inductor.

In one embodiment, the charging process has a charging resonant frequency, whereas, the at least one discharging process has a discharging resonant frequency, and wherein the charging resonant frequency is identical to the discharging resonant frequency.

In one embodiment, the charging process has a charging resonant frequency, whereas, the at least one discharging process has a discharging resonant frequency, and wherein the charging resonant frequency is different from the discharging resonant frequency.

In one embodiment, a duration period of the charging process is adjustable to achieve zero voltage switching.

In one embodiment, a duration period of the at least one discharging process is adjustable to achieve zero voltage switching.

In one embodiment, the resonant switched-capacitor converter is a bidirectional resonant switched-capacitor converter.

In one embodiment, a voltage conversion ratio of the input voltage to the first stage voltage of the resonant switched-capacitor converter is 4:1, 3:1 or 2:1.

Advantages of the present invention include: that the present invention can adjust the delay interval, that the present invention can adjust the resonant frequency of the resonant switched-capacitor converter and the switching frequency of the voltage regulator, and that the present invention can reduce the resonant frequency of the resonant switched-capacitor converter and the switching frequency of the voltage regulator, to improve the efficiency at light load condition.

Further advantages of the present invention include: that the present invention can synchronize the resonant frequency of the resonant switched-capacitor converter and the switching frequency of the voltage regulator, so as to enhance the EMI filtering performance, that the present invention can achieve soft-switching such as zero current switching (ZCS) or zero voltage switching (ZVS) to provide high power efficiency, and that the present invention can flexibly adjust the voltage conversion ratio of the resonant switched-capacitor converter by setting proper control of the switches.

Still other advantages of the present invention include: that all resonant capacitors of the resonant switched-capacitor converter can have the same rated current and rated voltage, so that the present invention can support using capacitors with a smaller size, and that the present invention can lower voltage stress of the resonant switched-capacitor converter.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 2:
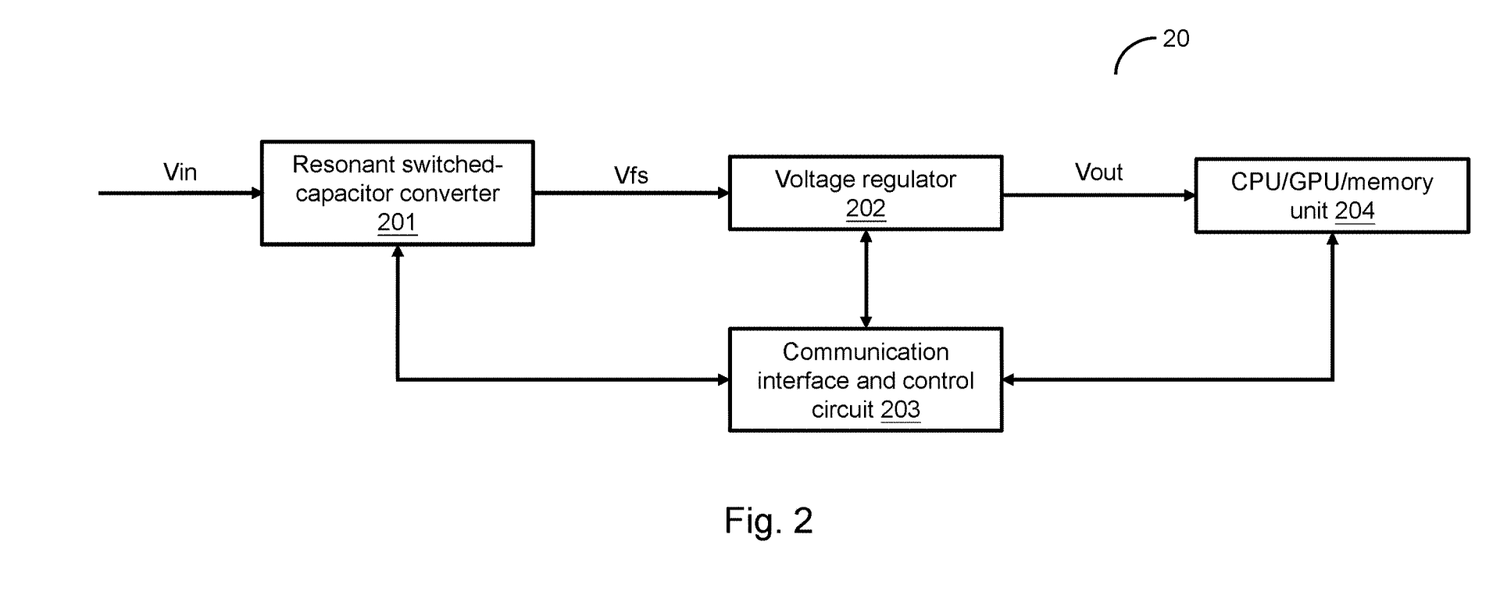
FIG. 2 illustrates a schematic block diagram of a two-stage power converter according to one embodiment of the present invention.

FIG. 2 illustrates a schematic block diagram of a two-stage power converter according to one embodiment of the present invention. Please refer to FIG. 2. The two-stage power converter 20 of the present invention includes a resonant switched-capacitor converter 201, a voltage regulator 202 and a communication interface and control circuit 203. The voltage regulator 202 is coupled to the resonant switched-capacitor converter 201, whereas the communication interface and control circuit 203 is coupled to both the resonant switched-capacitor converter 201 and the voltage regulator 202. The resonant switched-capacitor converter 201 is configured to receive an input voltage Vin and to generate a first stage voltage Vfs. The voltage regulator 202 is configured to receive the first stage voltage Vfs and to generate an output voltage Vout. The communication interface and control circuit 203 is configured to operably generate a charging operation signal, at least one discharging operation signal and a switching signal. The charging operation signal and the at least one discharging operation signal are employed to control the resonant switched-capacitor converter 201, whereas the switching signal is employed to control the voltage regulator 202, so as to synchronize a resonant frequency of the resonant switched-capacitor converter 201 and a switching frequency of the voltage regulator 202.

As shown in FIG. 2, in one embodiment, the voltage regulator 202 and the communication interface and control circuit 203 are further coupled to a central processing unit or graphics processing unit or memory unit (CPU/GPU/memory) 204 (that is, the circuit 204 can be a central processing unit, a graphics processing unit, a memory unit, or a combination thereof). The output voltage Vout is employed to supply power to the CPU/GPU/memory 204.

In one embodiment, the communication interface and control circuit 203 can adjust the charging operation signal, the at least one discharging operation signal and the switching signal according to a load requirement of the CPU/GPU/memory 204, so as to adjust a ratio of the input voltage Vin to the first stage voltage Vfs and a ratio of the first stage voltage Vfs to the output voltage Vout. In one embodiment, the adjustment operation of the charging operation signal and/or the at least one discharging operation signal can include delaying a rise switching time point of the charging operation signal and/or the at least one discharging operation signal for a delay interval, so as to adjust the ratio of the input voltage Vin to the first stage voltage Vfs. In another embodiment, the communication interface and control circuit 203 can adjust the charging operation signal, the at least one discharging operation signal and the switching signal according to the load requirement of the CPU/GPU/memory 204, so as to adjust a resonant frequency of the resonant switched-capacitor converter 201 and a switching frequency of the voltage regulator 202. In one embodiment, the adjustment operation of the charging operation signal and/or the at least one discharging operation signal can include delaying a rise switching time point of the charging operation signal and/or the at least one discharging operation signal for a delay interval, so as to adjust the resonant frequency of the resonant switched-capacitor converter 201. The communication interface can be, for example but not limited to, $I^2C$ (Inter-Integrated Circuit) interface.

The advantages of the present invention over the prior art at least include the following: firstly, according to the present invention, the communication interface and control circuit 203 provides an overall control in adjusting the frequency of the charging operation signal and/or the frequency of the at least one discharging operation signal and/or the delay interval to optimize the power conversion efficiency of the first stage converter (i.e. the resonant switched-capacitor converter) and the second stage converter (i.e. the voltage regulator) of the two-stage power converter; secondly, according to the present invention, when the CPU/GPU/memory 204 is at light load condition, the frequency of the charging operation signal and/or the frequency of the at least one discharging operation signal can be decreased, to enhance the power conversion efficiency; thirdly, according to the present invention, the communication interface and control circuit 203 can synchronize the frequencies of the charging operation signal, the at least one discharging operation signal and the operation signal, to reduce electromagnetic interference (EMI); fourthly, according to the present invention, soft switching can be achieved in the two-stage power converter of the present invention, such as zero current switching or zero voltage switching, to enhance power conversion efficiency; fifthly, according to the present invention, the resonant switched-capacitor converter has an adjustable voltage conversion ratio, for example the voltage conversion ratio of the input voltage Vin to the first stage voltage Vfs of the resonant switched-capacitor converter can be 4:1, 3:1 or 2:1; sixthly, in the same range of input voltage, the resonant switched-capacitor converter according to the present invention can employ capacitors with a smaller size to achieve the same conversion ratio.

Figure 3:
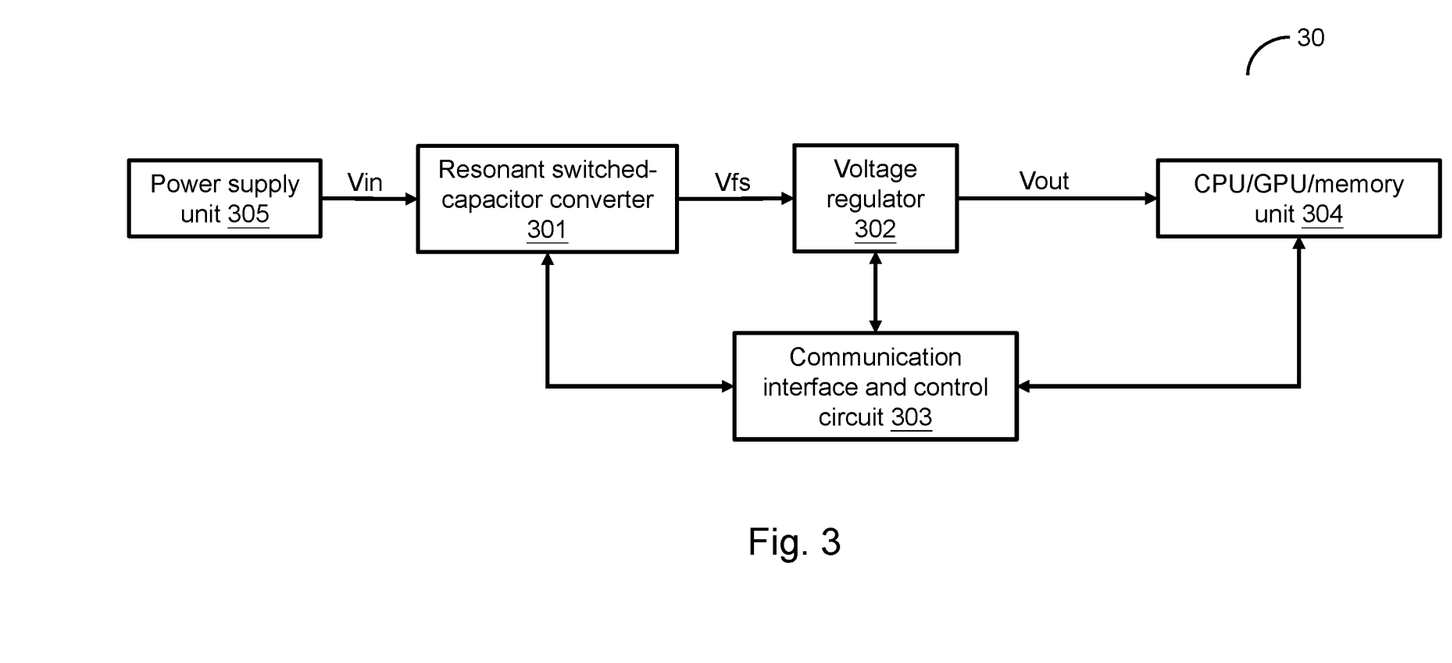
FIG. 3 illustrates a schematic block diagram of a two-stage power converter according to another embodiment the present invention.

FIG. 3 illustrates a schematic block diagram of a two-stage power converter according to another embodiment the present invention. The difference between this embodiment and the embodiment shown in FIG. 2 is that this embodiment further includes a power supply unit 305. The resonant switched-capacitor converter 301, the voltage regulator 302, the communication interface and control circuit 303 and the central processing unit/graphics processing unit/memory unit 304 of this embodiment are similar to the resonant switched-capacitor converter 201, the voltage regulator 202, the communication interface and control circuit 203 and the CPU/GPU/memory 204 of FIG. 2, and therefore the detailed descriptions thereof are omitted. As shown in FIG. 3, the two-stage power converter 30 of the present invention can further include a power supply unit 305 coupled to the resonant switched-capacitor converter 301 to provide the input voltage Vin. In one embodiment, the power supply unit 305 includes an electromagnetic interference (EMI) suppressor having a filtering band. The synchronized resonant frequency of the resonant switched-capacitor converter 301 and the synchronized switching frequency of the voltage regulator 302 can be designed to be within the filtering band of the EMI suppressor, such that the electromagnetic noise of the resonant switched-capacitor converter 301 and the voltage regulator 302 can be filtered out at the same time, so as to enhance the EMI reduction effect.

Figure 4:
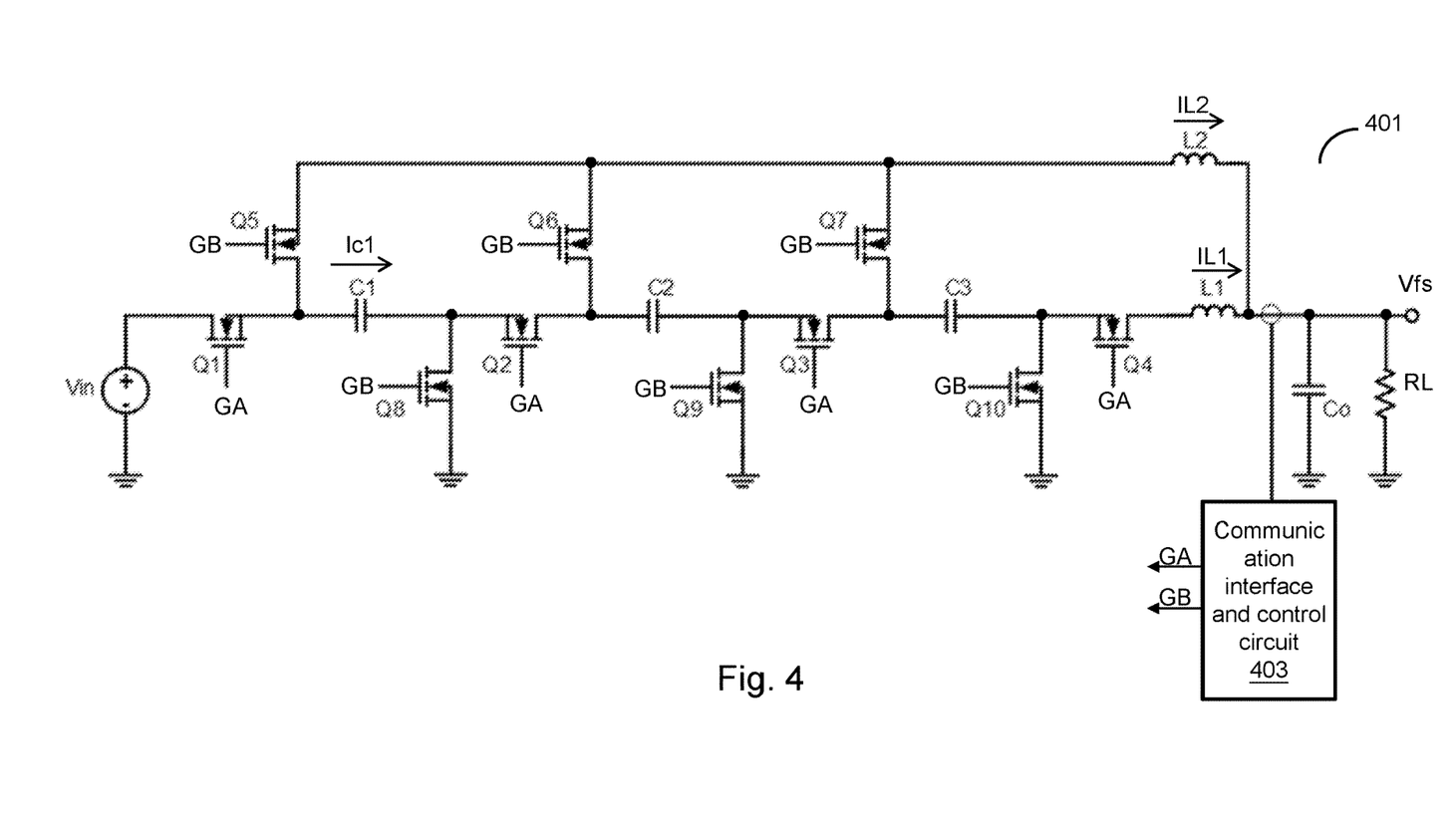
FIG. 4 illustrates a schematic circuit diagram of a resonant switched-capacitor converter of a two-stage power converter according to one embodiment of the present invention.

FIG. 4 illustrates a schematic circuit diagram of a resonant switched-capacitor converter 401 of a two-stage power converter according to one embodiment of the present invention. This embodiment includes several capacitors which share one charging inductor and/or one discharging inductor. Thus, although there are plural capacitors, regardless how many the capacitors may be, only one charging inductor and only one discharging inductor are required so that the required number of inductors is reduced. As shown in FIG. 4, the resonant switched-capacitor converter 401 of the two-stage power converter of the present invention includes: capacitors C1, C2 and C3, switches Q1, Q2, Q3, Q4, Q5, Q6, Q7, Q8, Q9 and Q10, a charging inductor L1 and a discharging inductor L2. The switches Q1, Q2 and Q3 are connected in series to the capacitors C1, C2 and C3, respectively. The switch Q4 is connected in series to the charging inductor L1. Certainly, it should be understood that the implementation of the number of the capacitors of the resonant switched-capacitor converter 401 of the two-stage power converter of the present invention as three in the above-mentioned preferred embodiment is only an illustrative example, but not for limiting the broadest scope of the present invention. In other embodiments, it is also practicable and within the scope of the present invention that the number of the capacitors of the resonant switched-capacitor converter 401 of the two-stage power converter of the present invention can be a plural number other than three. It should be understood that the number of devices in the above-mentioned preferred embodiment, unless emphasized as a feature, is only an illustrative example, but not for limiting the broadest scope of the present invention.

As shown in FIG. 4, one end of the switch Q5 is coupled to a node between the switch Q1 and the capacitor C1. One end of the switch Q6 is coupled to a node between the switch Q2 and the capacitor C2. One end of the switch Q7 is coupled to a node between the switch Q3 and the capacitor C3. One end of the switch Q8 is coupled to a node between the switch Q2 and the capacitor C1. One end of the switch Q9 is coupled to a node between the switch Q3 and the capacitor C2. One end of the switch Q10 is coupled to a node between the switch Q4 and the capacitor C3. As shown in FIG. 4, the other ends of the switches Q5-Q7 are commonly electrically connected to a node which is connected to the discharging inductor L2. The other ends of the switches Q8-Q10 are commonly coupled to the ground voltage level. The other ends of the charging inductor L1 and the discharging inductor L2 are commonly coupled to the first stage voltage Vfs. The other end of the switch Q1 is coupled to the input voltage Vin. The communication interface and control unit 403 is configured to operably generate a charging operation signal GA corresponding to a charging process and a discharging operation signal GB corresponding to a discharging process, to operate the switches Q1-Q10, such that the switches Q1-Q10 switch electrical connections of the capacitors C1-C3. (In the context of this invention, a switch is regarded as a two-end device and its control terminal is regarded as a control input, not an "end".)

The switches Q1-Q10 can respectively switch electrical connections of the capacitors C1-C3 with the charging inductor L1 and the discharging inductor L2 according to the charging operation signal GA and the discharging operation signal GB generated by the communication interface and control circuit 403. In one embodiment, the charging operation signal GA and the discharging operation signal GB have respective ON periods which do not overlap with one another.

In a charging process, according to the charging operation signal GA, the switches Q1-Q4 are controlled to be ON, whereas, the switches Q5-Q10 are controlled to be OFF, such that a series connection of the capacitors C1-C3 and the charging inductor L1 is formed between the input voltage Vin and the first stage voltage Vfs, which forms a charging path. In a discharging process, according to the discharging operation signal GB, the switches Q5-Q10 are controlled to be ON, whereas, the switches Q1-Q4 are controlled to be OFF, such that such that the capacitors C1, C2 and C3 are connected in parallel and the parallel connection is connected in series to the discharging inductor L2, to form plural discharging paths.

In one embodiment, the communication interface and control circuit 403 adjusts a delay interval after the discharging process ends and starts the charging process at an end time point of the delay interval. The communication interface and control circuit 403 keeps the switches Q1-Q10 OFF during the delay interval. In one embodiment, the communication interface and control circuit 403 adjusts a delay interval after the charging process ends and starts the discharging process at an end time point of the delay interval. The communication interface and control circuit 403 keeps the switches Q1-Q10 OFF during the delay interval. In one embodiment, the delay interval can be adjusted, so as to adjust the resonant frequency of the resonant switched-capacitor converter 401. In one embodiment, the delay interval can be adjusted, so as to adjust the ratio of the input voltage Vin to the first stage voltage Vfs of the resonant switched-capacitor converter 401.

It should be noted that, in one embodiment, the above-mentioned charging process and the above-mentioned discharging process are performed at different periods in a repeated, alternating manner. That is, the above-mentioned charging process and the above-mentioned discharging process are not performed at the same time. In one embodiment, the charging process and the discharging process are arranged in a repeated, alternating manner, so as to convert the input voltage Vin into the first stage voltage Vfs. In this embodiment, the DC bias voltages of the capacitors C1, C2 and C3 all have a level of Vo. As a consequence, in a case where the same level of the input voltage Vin and the same level of the first stage voltage Vfs are provided, the capacitors C1, C2 and C3 of this embodiment, as compared to the prior art, will only need to withstand a relatively lower rated voltage. Hence, this embodiment can utilize capacitors having a smaller size.

In one embodiment, the charging resonant frequency of the above-mentioned charging process is identical to the discharging resonant frequency of the above-mentioned discharging process. In one embodiment, the charging resonant frequency of the above-mentioned charging process is different from the discharging resonant frequency of the above-mentioned discharging process. In one embodiment, the above-mentioned resonant switched-capacitor converter 401 can be a bidirectional resonant switched-capacitor converter. As one having ordinary skill in the art will further appreciate, "bidirectional resonant switching power converter" refers to a converter whose input terminal (which is coupled to the input voltage Vin) and an output terminal (which supplies the first stage voltage Vfs) are interchangeable. That is, in the embodiment shown in FIG. 4, the resonant switched-capacitor converter 401 may convert the first stage voltage Vfs into the input voltage Vin. In one embodiment, a voltage conversion ratio of the input voltage Vin to the first stage voltage Vfs of the above-mentioned resonant switched-capacitor converter 401 can be 4:1, 3:1 or 2:1.

In one embodiment, the duration period (Ton1) of the above-mentioned charging process is correlated with the charging resonant frequency (fr1) of the above-mentioned charging process. In one preferred embodiment, the duration period (Ton1) of the above-mentioned charging process is correlated with a positive half wave of a charging resonant current of the charging process. For example, ON time points and OFF time points of the switches Q1-Q4 are substantially synchronous with a start time point and an end time point of the positive half wave of the charging resonant current of the charging process. In one embodiment, the duration period (Ton2) of the above-mentioned discharging process is correlated with the discharging resonant frequency (fr2) of the above-mentioned discharging process. In one preferred embodiment, the duration period (Ton2) of the above-mentioned discharging process is correlated with a positive half wave of a discharging resonant current of the discharging process. For example, ON time points and OFF time points of the switches Q5-Q10 are substantially synchronous with a start time point and an end time point of the positive half wave of the discharging resonant current of the discharging process.

In the embodiment where the charging resonant frequency (fr1) of the above-mentioned charging process is equal to the discharging resonant frequency (fr2) of the above-mentioned discharging process, when the duration period (Ton1) of the above-mentioned charging process is equal to the duration period (Ton2) of the above-mentioned discharging process (e.g., when the duration period (Ton1) of the above-mentioned charging process is substantially equal to 50% of the cycle period, i.e., 50% duty ratio), the switches can be switched at a time point at which the currents flowing through the switches are at a relatively lower level of their respective positive half waves, such that soft switching can be achieved. In one preferred embodiment, zero current switching (ZCS) can be achieved.

Note that although it is preferred that the duration period of the charging process is equal to the duration period of the discharging process (i.e., the duration period of the charging process is equal to 50% of the cycle period), to achieve exact zero current switching, however due to non-idealities caused by for example imperfection of components or imperfect matching among components, the duration period of the charging process may not be equal to exactly 50% of the cycle period, but just close to 50% of the cycle period. In other words, according to the present invention, a certain level of error between the duration period of the charging process and 50% of the cycle period is acceptable, and therefore the term "substantially" is used to mean that an insignificant error within a tolerable range is acceptable. The term "substantially" used hereinafter in this specification also means that an insignificant error within a tolerable range is acceptable.

In one embodiment, the duration period of the above-mentioned charging process is smaller than a specific ratio of the cycle period by a predetermined period. For example, the duration period of the above-mentioned charging process is smaller than 50% of the cycle period by a predetermined period. As a result, Thus, after the switches Q1-Q4 have been turned OFF, a little amount of current remains, which flows through the charging inductor L1 to take away accumulated charges stored in a parasitic capacitor of the switch Q10 via the parasitic diode of the switch Q4, so that the voltage across the switch Q10 can be reduced, thus achieving soft switching. In one preferred embodiment, the predetermined period can be adjusted, such that zero voltage switching can be achieved. In one embodiment, on the other hand, the duration period of the above-mentioned discharging process is greater than a specific ratio of the cycle period by a predetermined period. For example, the duration period of the above-mentioned discharging process is greater than 50% of the cycle period by a predetermined period. As a result, Thus, during the delayed turned-OFF period of the switches Q5-Q10, a negative current of the discharging inductor L2 will flow through a parasitic diode of the switch Q5, to charge a parasitic capacitor of the switch Q1. As a result, the voltage across the switch Q1 will be reduced, for achieving soft switching. In one preferred embodiment, the predetermined period can be adjusted, such that zero voltage switching can be achieved.

Figure 5:
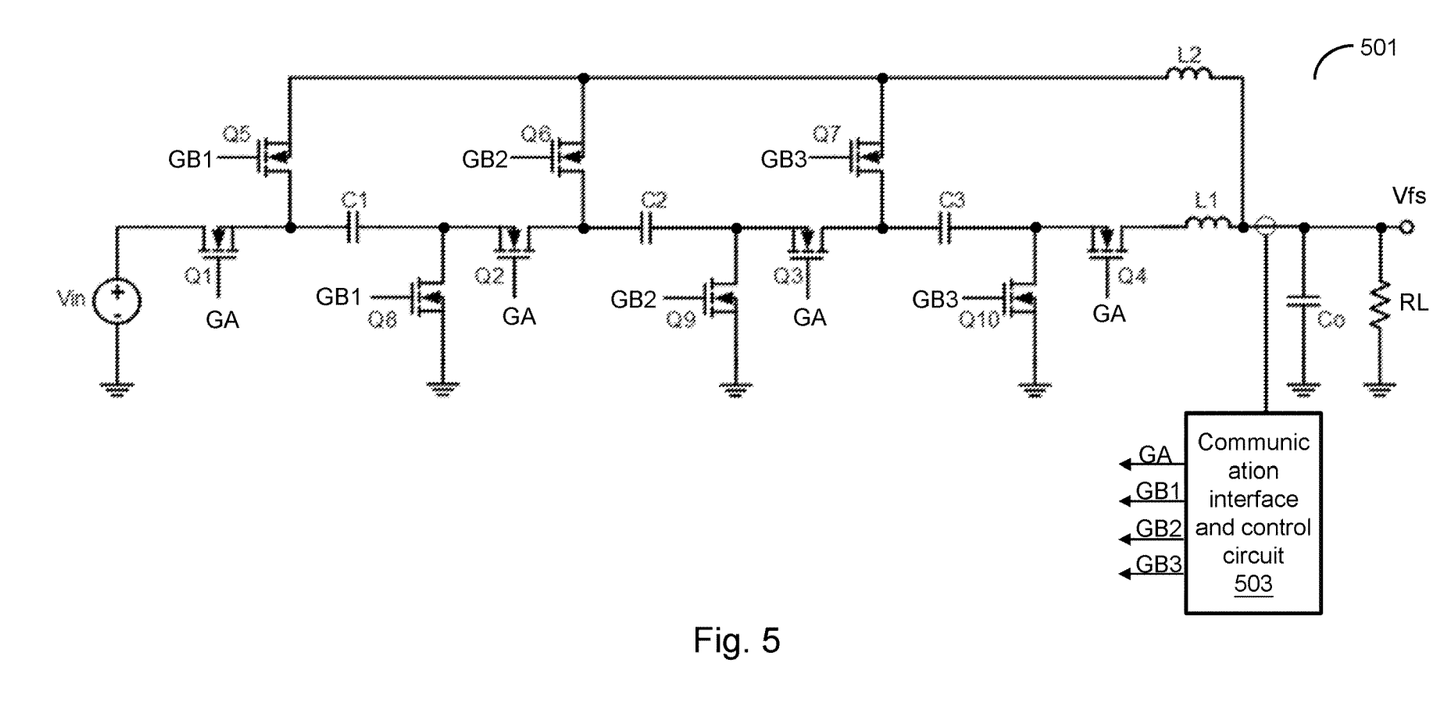
FIG. 5 illustrates a schematic circuit diagram of a resonant switched-capacitor converter of a two-stage power converter according to another embodiment of the present invention.

FIG. 5 illustrates a schematic circuit diagram of a resonant switched-capacitor converter of a two-stage power converter according to one embodiment of the present invention. The difference of this embodiment and the embodiment shown in FIG. 4 is that there are plural discharging processes in this embodiment. The communication interface and control circuit 503 is configured to operably generate a charging operation signal GA corresponding to a charging process and plural discharging operation signals GB1, GB2 and GB3 corresponding to three discharging processes, so as to operate the switches Q1-Q10 such that the switches Q1-Q10 switch electrical connections of the capacitors C1-C3.

The switches Q1-Q10 can respectively switch electrical connections of the capacitors C1-C3 with the charging inductor L1 and the discharging inductor L2 according to the charging operation signal GA and the discharging operation signals GB1, GB2 and GB3 generated by the communication interface and control circuit 503. In one embodiment, the charging operation signal GA and the discharging operation signals GB1, GB2 and GB3 have respective ON periods which do not overlap with one another.

For example, in a charging process, according to the charging operation signal GA, the switches Q1-Q4 are controlled to be ON, whereas, the switches Q5-Q10 are controlled to be OFF, such that a series connection of the capacitors C1-C3 and the charging inductor L1 is formed between the input voltage Vin and the first stage voltage Vfs, which forms a charging path. In a first discharging process, according to the discharging operation signal GB1, the switches Q5 and Q8 are controlled to be ON, whereas, the switches Q1-Q4, Q6, Q7, Q9 and Q10 are controlled to be OFF, such that the capacitor C1 is connected in series to the discharging inductor L2, which forms a first discharging path. In a second discharging process, according to the discharging operation signal GB2, the switches Q6 and Q9 are controlled to be ON, whereas, the switches Q1-Q4, Q5, Q7, Q8 and Q10 are controlled to be OFF, such that the capacitor C2 is connected in series to the discharging inductor L2, which forms a second discharging path. In a third discharging process, according to the discharging operation signal GB3, the switches Q7 and Q10 are controlled to be ON, whereas, the switches Q1-Q4, Q5, Q6, Q8 and Q9 are controlled to be OFF, such that the capacitor C3 is connected in series to the discharging inductor L2, which forms a third discharging path. The three discharging processes and three discharging paths therein are formed separately at different time periods.

In one embodiment, the communication interface and control circuit 503 adjusts a delay interval after the charging process ends and starts the first discharging process at an end time point of the delay interval. The communication interface and control circuit 503 keeps the switches Q1-Q10 OFF during the delay interval. In one embodiment, the communication interface and control circuit 503 adjusts a delay interval after the first discharging process ends and starts the second discharging process at an end time point of the delay interval. The communication interface and control circuit 503 keeps the switches Q1-Q10 OFF during the delay interval. In one embodiment, the communication interface and control circuit 503 adjusts a delay interval after the second discharging process ends and starts the third discharging process at an end time point of the delay interval. The communication interface and control circuit 503 keeps the switches Q1-Q10 OFF during the delay interval. In one embodiment, the communication interface and control circuit 503 adjusts a delay interval after the third discharging process ends and starts the charging process at an end time point of the delay interval. The communication interface and control circuit 503 keeps the switches Q1-Q10 OFF during the delay interval. In one embodiment, the delay interval can be adjusted, so as to adjust the resonant frequency of the resonant switched-capacitor converter 501. In one embodiment, the delay interval can be adjusted, so as to adjust the ratio of the input voltage Vin to the first stage voltage Vfs of the resonant switched-capacitor converter 501.

It should be noted that, the above-mentioned charging process and the above-mentioned first discharging process, second discharging process and third discharging process are performed at different periods in a repeated, alternating manner. That is, the above-mentioned charging process and the above-mentioned first discharging process, second discharging process and third discharging process are not performed at the same time. In one embodiment, the charging process and the above-mentioned three discharging processes are arranged in a repeated, alternating manner, so as to convert the input voltage Vin into the first stage voltage Vfs. In other words, after one charging process has completed, the first discharging process, the second discharging process and the third discharging process are then performed in sequential order. Subsequently, the charging process is performed again, and so on.

Figure 6:
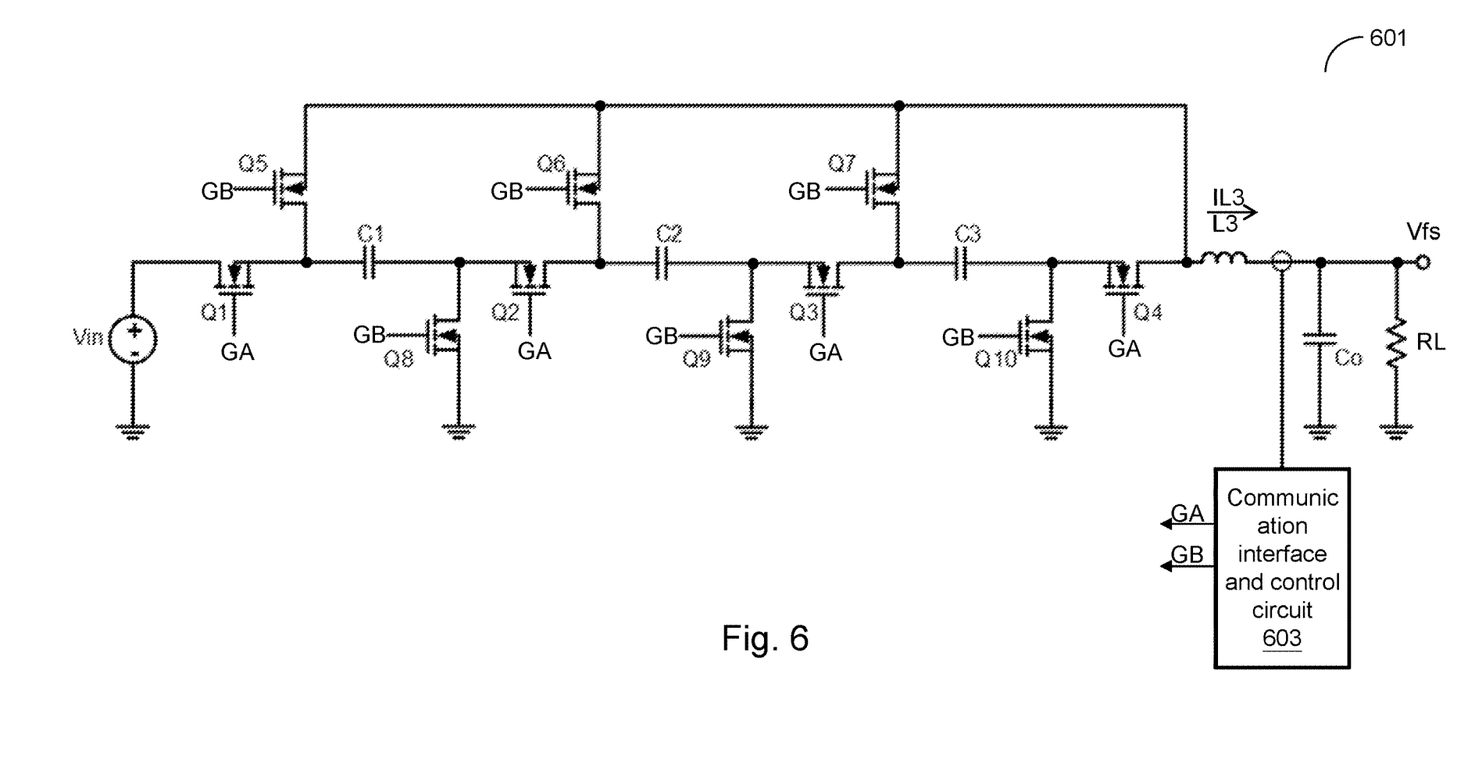
FIG. 6 illustrates a schematic circuit diagram of a resonant switched-capacitor converter of a two-stage power converter according to still another embodiment of the present invention.

Please refer to FIG. 6. FIG. 6 illustrates a schematic circuit diagram of a resonant switched-capacitor converter 601 of the two-stage power converter according to yet another embodiment of the present invention. The configuration of a communication interface and control circuit 603 in FIG. 6 is similar to FIG. 4 and the detailed descriptions thereof are therefore omitted. The difference between this embodiment and the embodiment shown in FIG. 4 is that the charging inductor and the discharging inductor of this embodiment can be one same inductor L3. This implementation can reduce the required inductor number. As shown in FIG. 6, the resonant switched-capacitor converter 601 of the two-stage power converter of the present invention includes: capacitors C1, C2 and C3, switches Q1, Q2, Q3, Q4, Q5, Q6, Q7, Q8, Q9 and Q10, and an inductor L3. The switches Q1, Q2 and Q3 are connected in series to the capacitors C1, C2 and C3, respectively. The switch Q4 is connected in series to the inductor L3. Certainly, it should be understood that the implementation of the number of the capacitors of the resonant switched-capacitor converter 601 of the two-stage power converter as three in the above-mentioned preferred embodiment is only an illustrative example, but not for limiting the broadest scope of the present invention. In other embodiments, it is also practicable and within the scope of the present invention that the number of the capacitors of the resonant switched-capacitor converter 601 of the two-stage power converter can be a plural number other than three. It should be understood that the number of devices in the above-mentioned preferred embodiment, unless emphasized as a feature, is only an illustrative example, but not for limiting the broadest scope of the present invention.

It is noteworthy that, in this embodiment, the charging inductor and the discharging inductor are one same single inductor L3. In the discharging process, through switching the switches Q1-Q10, the capacitors C1, C2 and C3 are connected in parallel and the parallel connection is connected in series to the same single inductor L3. That "the charging inductor and the discharging inductor is one same single inductor L3" means that a charging resonant current IL3 flows through the single inductor L3 during the charging process, whereas, a discharging resonant current IL3 flows through the single inductor L3 during the discharging process; neither the charging resonant current IL3 nor the discharging resonant current IL3 will flow through any other inductor. In one embodiment, the same single inductor L3 can be a variable inductor.

As shown in FIG. 6, one end of the switch Q5 is coupled to a node between the switch Q1 and the capacitor C1. One end of the switch Q6 is coupled to a node between the switch Q2 and the capacitor C2. One end of the switch Q7 is coupled to a node between the switch Q3 and the capacitor C3. One end of the switch Q8 is coupled to a node between the switch Q2 and the capacitor C1. One end of the switch Q9 is coupled to a node between the switch Q3 and the capacitor C2. One end of the switch Q10 is coupled to a node between the switch Q4 and the capacitor C3. As shown in FIG. 6, the other ends of the switches Q5-Q7 are commonly electrically connected to a node between the switch Q4 and the inductor L3. The other ends of the switches Q8-Q10 are commonly coupled to the ground voltage level. The other end of the inductor L3 is coupled to the first stage voltage Vfs. The other end of the switch Q1 is coupled to an input voltage Vin.

The switches Q1-Q10 can respectively switch electrical connections between the capacitors C1-C3 and the inductor L3 according to the charging operation signal GA and the discharging operation signal GB generated by the communication interface and control circuit 603. In a charging process, according to the charging operation signal GA, the switches Q1-Q4 are controlled to be ON, whereas, the switches Q5-Q10 are controlled to be OFF, such that a series connection of the capacitors C1-C3 and the inductor L3 is formed between the input voltage Vin and the first stage voltage Vfs, which forms a charging path. In a discharging process, according to the discharging operation signal GB, the switches Q5-Q10 are controlled to be ON, whereas, the switches Q1-Q4 are controlled to be OFF, such that the capacitors C1, C2 and C3 are connected in parallel and the parallel connection is connected in series to the inductor L3, to form plural discharging paths. It is noteworthy that, in one embodiment, the above-mentioned charging process and the above-mentioned discharging process are performed at different periods in a repeated, alternating manner. That is, the above-mentioned charging process and the above-mentioned discharging process are not performed at the same time. The charging process and the discharging process are arranged in a repeated, alternating manner, so as to convert the input voltage Vin into the first voltage Vfs. In this embodiment, the DC bias voltages of the capacitors C1, C2 and C3 all have a level of Vo. As a consequence, the capacitors C1, C2 and C3 of this embodiment will only need to withstand a relatively lower rated voltage. Hence, this embodiment can utilize capacitors having a smaller size.

In one embodiment, the communication interface and control circuit 603 adjusts a delay interval after the discharging process ends and starts the charging process at an end time point of the delay interval. The communication interface and control circuit 603 keeps the switches Q1-Q10 OFF during the delay interval. In one embodiment, the communication interface and control circuit 603 adjusts a delay interval after the charging process ends and starts the discharging process at an end time point of the delay interval. The communication interface and control circuit 603 keeps the switches Q1-Q10 OFF during the delay interval. In one embodiment, the delay interval can be adjusted, so as to adjust the resonant frequency of the resonant switched-capacitor converter 601. In one embodiment, the delay interval can be adjusted, so as to adjust the ratio of the input voltage Vin to the first stage voltage Vfs of the resonant switched-capacitor converter 601.

In the embodiment where the charging inductor and the discharging inductor are implemented as one same single inductor L3, soft switching such as zero current switching can be achieved through properly arranging a ratio of the duration period (Ton1) of the above-mentioned charging process to the duration period (Ton2) of the above-mentioned discharging process. To be more specific, in one embodiment, the duration period of the above-mentioned charging process can be substantially equal to for example 25% of the cycle period. The switches can be switched at a time point at which the currents flowing through the switches are at a relatively lower level of their respective positive half waves, such that soft switching can be achieved. In one preferred embodiment, zero current switching can be achieved. In one embodiment, the duration period of the above-mentioned charging process is smaller than a specific ratio of the cycle period by a predetermined period. For example, the duration period of the above-mentioned charging process is smaller than 25% of the cycle period by a predetermined period. Thus, after the switches Q1-Q4 have been turned OFF, a little amount of current remains, which flows through the inductor L3 to take away accumulated charges stored in a parasitic capacitor of the switch Q10 via the parasitic diode of the switch Q4, so that the voltage across the switch Q10 can be reduced, thus achieving soft switching. In one preferred embodiment, the predetermined period can be adjusted, so as to achieve zero voltage switching.

In one embodiment, on the other hand, the duration period of the above-mentioned discharging process is greater than a specific ratio of the cycle period by a predetermined period. For example, the duration period of the above-mentioned discharging process is greater than 75% of the cycle period by a predetermined period. Thus, during the delayed turned-OFF period of the switches Q5-Q10, a negative current of the inductor L3 will flow through a parasitic diode of the switch Q5, to charge a parasitic capacitor of the switch Q1. As a result, the voltage across the switch Q1 will be reduced, for achieving soft switching. In one preferred embodiment, the predetermined period can be adjusted, such that zero voltage switching can be achieved.

In one embodiment, the above-mentioned resonant switched-capacitor converter 601 can be a bidirectional resonant switched-capacitor converter. In one embodiment, a voltage conversion ratio of the input voltage Vin to the first stage voltage Vfs of the above-mentioned resonant switched-capacitor converter 601 can be 4:1, 3:1 or 2:1. In one embodiment, the voltage conversion ratio of the above-mentioned resonant switched-capacitor converter 601 can be flexibly adjusted. For example, in the charging process and in the discharging process, by keeping the switch Q7 to be always ON while keeping the switches Q4 and Q10 to be always OFF, the voltage conversion ratio of the resonant switched-capacitor converter 601 can be adjusted to 3:1. For another example, in the charging process and in the discharging process, through keeping the switch Q6 to be always ON while keeping the switches Q9, Q3, Q7, Q4 and Q10 to be always OFF, the voltage conversion ratio of the resonant switched-capacitor converter 601 can be adjusted to 2:1.

Figure 7:
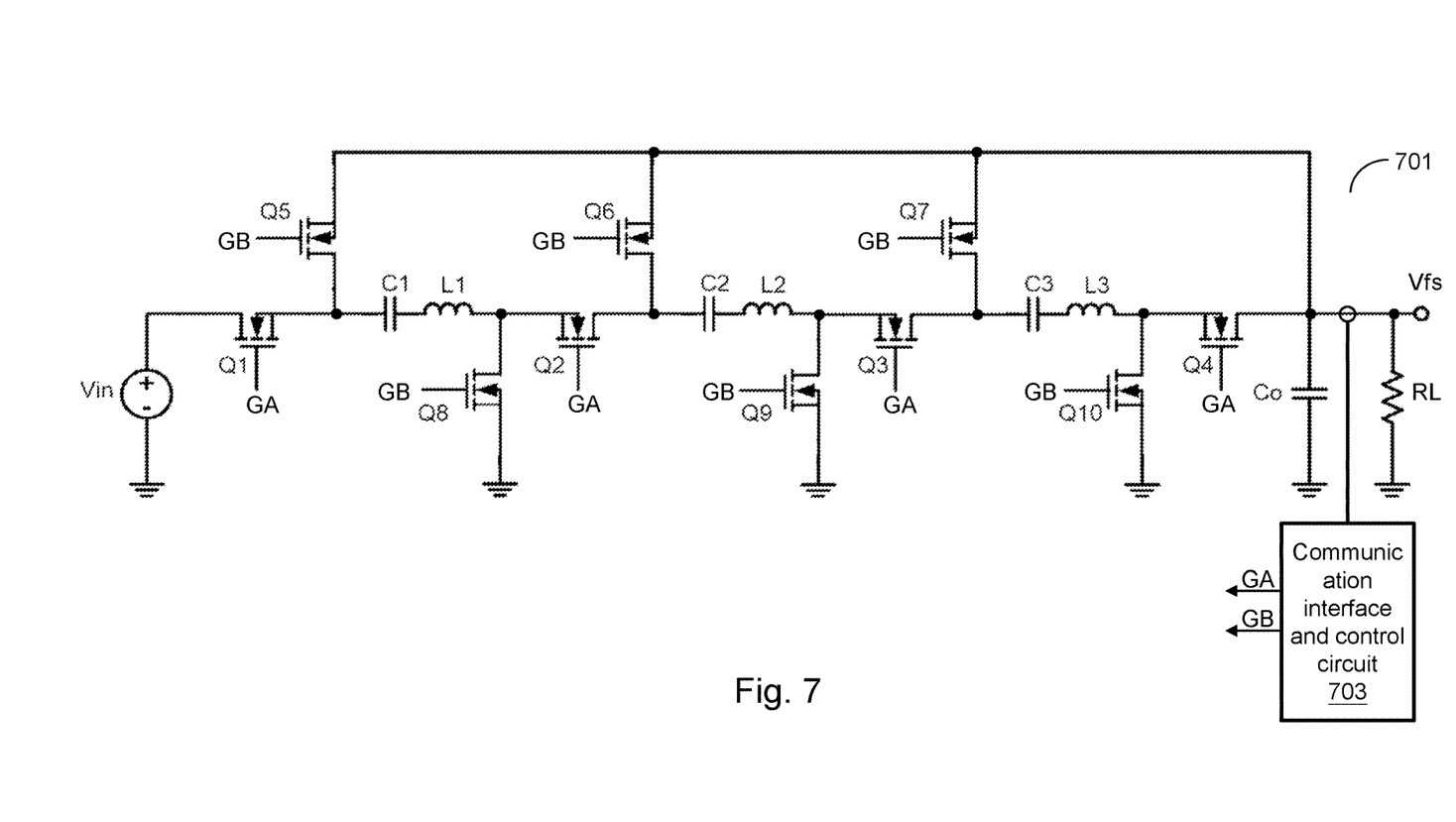
FIG. 7 illustrates a schematic circuit diagram of a resonant switched-capacitor converter of a two-stage power converter according to yet another embodiment of the present invention.

Please refer to FIG. 7. FIG. 7 illustrates a schematic circuit diagram of a resonant switched-capacitor converter 701 of the two-stage power converter according to yet another embodiment of the present invention. The configuration of the communication interface and control circuit 703 in FIG. 7 is similar to FIG. 4, and the detailed descriptions thereof are therefore omitted. As shown in FIG. 7, the resonant switched-capacitor converter 701 of the two-stage power converter of the present invention includes: capacitors C1, C2 and C3, switches Q1, Q2, Q3, Q4, Q5, Q6, Q7, Q8, Q9 and Q10 and inductors L1, L2, L3. The switches Q1, Q2 and Q3 are connected in series to the capacitors C1, C2 and C3, respectively, whereas, the capacitors C1-C3 are connected in series to the corresponding inductors L1-L3 respectively. Certainly, it should be understood that the implementation of the number of the capacitors of the resonant switched-capacitor converter 701 of the two-stage power converter of the present invention as three in the above-mentioned preferred embodiment is only an illustrative example, but not for limiting the broadest scope of the present invention. In other embodiments, it is also practicable and within the scope of the present invention that the number of the capacitors of the resonant switched-capacitor converter 701 of the two-stage power converter can be a plural number other than three. Besides, it should be understood that the implementation of the number of the inductors of the resonant switched-capacitor converter 701 of the two-stage power converter of the present invention as three in the above-mentioned preferred embodiment is only an illustrative example, but not for limiting the broadest scope of the present invention. In other embodiments, it is also practicable and within the scope of the present invention that the number of the inductors of the resonant switched-capacitor converter 701 can be a plural number other than three. It should be understood that the number of devices in the above-mentioned preferred embodiment, unless emphasized as a feature, is only an illustrative example, but not for limiting the broadest scope of the present invention.

As shown in FIG. 7, one end of the switch Q5 is coupled to a node between the switch Q1 and the capacitor C1. One end of the switch Q6 is coupled to a node between the switch Q2 and the capacitor C2. One end of the switch Q7 is coupled to a node between the switch Q3 and the capacitor C3. One end of the switch Q8 is coupled to a node between the switch Q2 and the inductor L1. One end of the switch Q9 is coupled to a node between the switch Q3 and the inductor L2. One end of the switch Q10 is coupled to a node between the switch Q4 and the inductor L3. As shown in FIG. 7, the other ends of the switches Q5-Q7 are commonly coupled to the first stage voltage Vfs. The other ends of the switches Q8-Q10 are commonly coupled to the ground voltage level. The switch Q4 is coupled between the inductor L3 and the first stage voltage Vfs. One end of the switch Q1 is coupled to an input voltage Vin.

The switches Q1-Q10 can respectively switch electrical connections between the capacitors C1-C3 and the inductors L1-L3 according to the charging operation signal GA and the discharging operation signal GB generated by the communication interface and control circuit 703. In a charging process, the switches Q1-Q4 are controlled to be ON, whereas, the switches Q5-Q10 are controlled to be OFF, such that a series connection of the capacitors C1-C3 and the inductors L1-L3 is formed between the input voltage Vin and the first stage voltage Vfs, which forms a charging path. In a discharging process, the switches Q5-Q10 are controlled to be ON, whereas, the switches Q1-Q4 are controlled to be OFF. As a result, a series connection of the capacitor C1 and the corresponding inductors L1 is formed between the first stage voltage Vfs and a ground voltage level; a series connection of the capacitor C2 and the corresponding inductors L2 is formed between the first stage voltage Vfs and the ground voltage level; a series connection of the capacitor C3 and the corresponding inductors L3 is formed between the first stage voltage Vfs and the ground voltage level; thus, plural discharging paths are formed.

In one embodiment, the communication interface and control circuit 703 adjusts a delay interval after the discharging process ends and starts the charging process at an end time point of the delay interval. The communication interface and control circuit 703 keeps the switches Q1-Q10 OFF during the delay interval. In one embodiment, the communication interface and control circuit 703 adjusts a delay interval after the charging process ends and starts the discharging process at an end time point of the delay interval. The communication interface and control circuit 703 keeps the switches Q1-Q10 OFF during the delay interval. In one embodiment, the delay interval can be adjusted, so as to adjust the resonant frequency of the resonant switched-capacitor converter 701. In one embodiment, the delay interval can be adjusted, so as to adjust the ratio of the input voltage Vin to the first stage voltage Vfs of the resonant switched-capacitor converter 701.

It is noteworthy that, in one embodiment, the above-mentioned charging process and the above-mentioned discharging process are performed at different periods in a repeated, alternating manner. That is, the above-mentioned charging process and the above-mentioned discharging process are not performed at the same time. In one embodiment, the charging process and the discharging process are arranged in a repeated, alternating manner, so as to convert the input voltage Vin into the first stage voltage Vfs. In this embodiment, the DC bias voltages of the capacitors C1, C2 and C3 all have a level of Vo. As a consequence, the capacitors C1, C2 and C3 of this embodiment will only need to withstand a relatively lower rated voltage. Hence, this embodiment can utilize capacitors having a smaller size.

In one embodiment, the duration period of the above-mentioned charging process is substantially equal to a specific ratio of the cycle period. For example, the duration period of the above-mentioned charging process is substantially equal to, for example but not limited to, 50% of the cycle period. As a result, the switches can be switched at a time point at which the current flowing through the switches is at a relatively lower level of its positive half wave, such that soft switching can be achieved. In one preferred embodiment, zero current switching can be achieved.

In one embodiment, the above-mentioned specific ratio is correlated with the resonant frequency. In one embodiment, the above-mentioned charging process has a charging resonant frequency, whereas, the above-mentioned discharging process has a discharging resonant frequency. In one preferred embodiment, the above-mentioned charging resonant frequency is identical to the above-mentioned discharging resonant frequency. In one embodiment, the above-mentioned charging resonant frequency is different from the above-mentioned discharging resonant frequency.

Figure 8A:
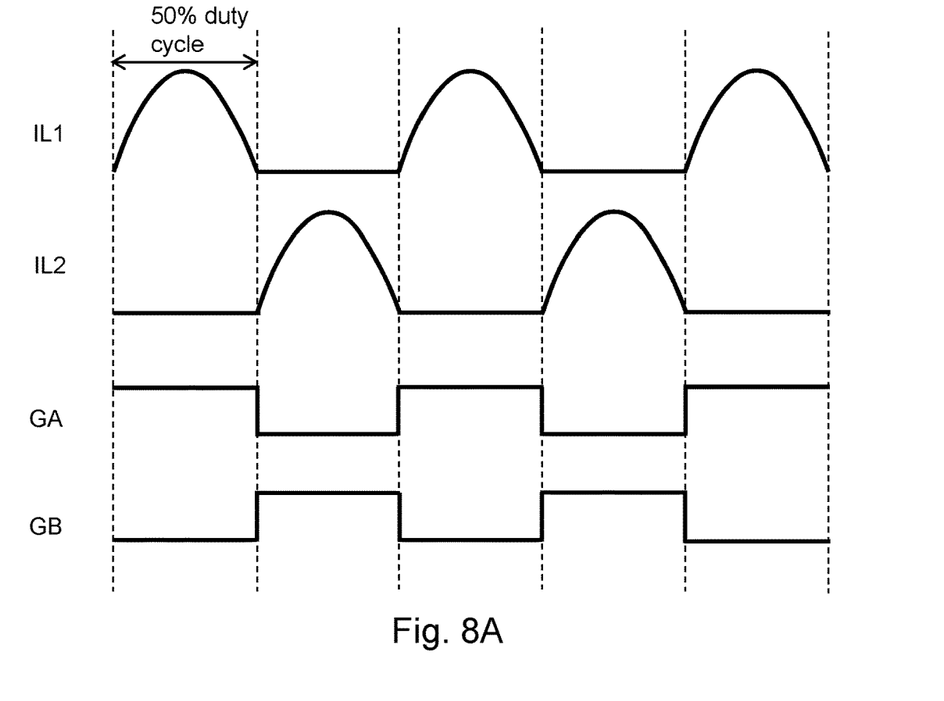
FIGS. 8A, 8B and 8C illustrate waveform diagrams of operation signals and inductor currents corresponding to a charging process and a discharging process of a resonant switched-capacitor converter of a two-stage power converter according to one embodiment of the present invention.

Please refer to FIG. 8A, which illustrates waveform diagrams of operation signals and inductor currents corresponding to a charging process and a discharging process of the resonant switched-capacitor converter of the two-stage power converter according to one embodiment of the present invention. Please refer to FIG. 4 along with FIG. 8A. In the embodiment shown in FIG. 8A, the charging operation signal GA corresponding to the switches Q1-Q4 is at high level in the charging process, whereas, the discharging operation signal GB corresponding to the switches Q5-Q10 is at high level in the discharging process. In the embodiment shown in FIG. 8A, the duration period of the charging process is substantially equal to 50% of the cycle period. As a result, the switches can be switched at a time point at which the current flowing through the switch Q1 are at a relatively lower level of its positive half wave (i.e., the switches can be switched at a time point at which a charging inductor current IL1 flowing through the charging inductor L1 is substantially equal to zero), such that soft switching can be achieved. In one preferred embodiment, zero current switching can be achieved.

Figure 8B:
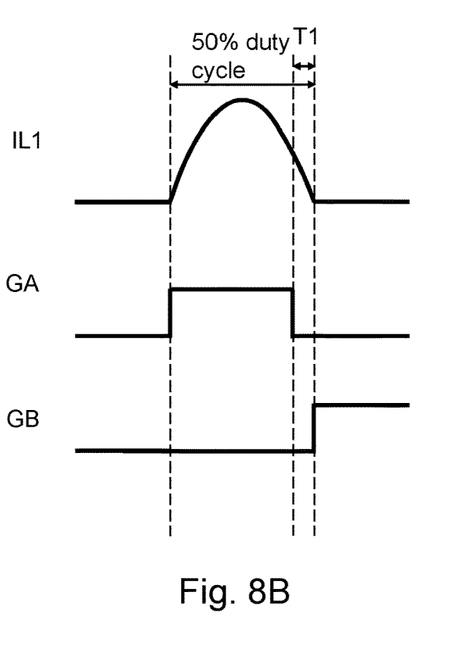
Figure 8C:
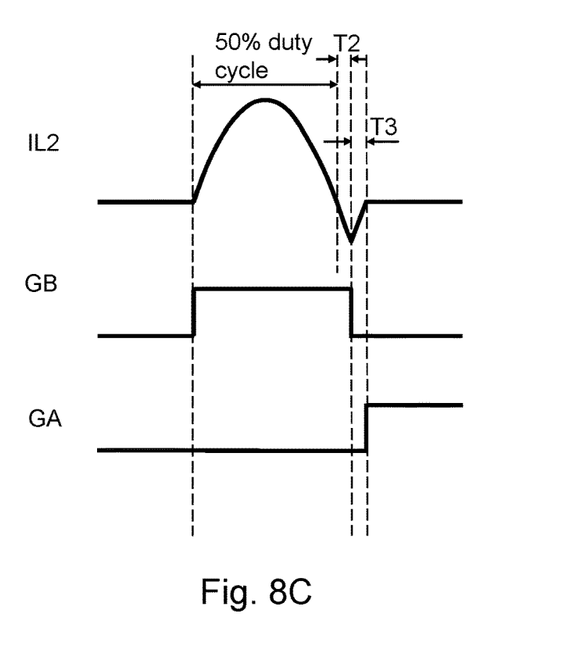
Figure 8D:
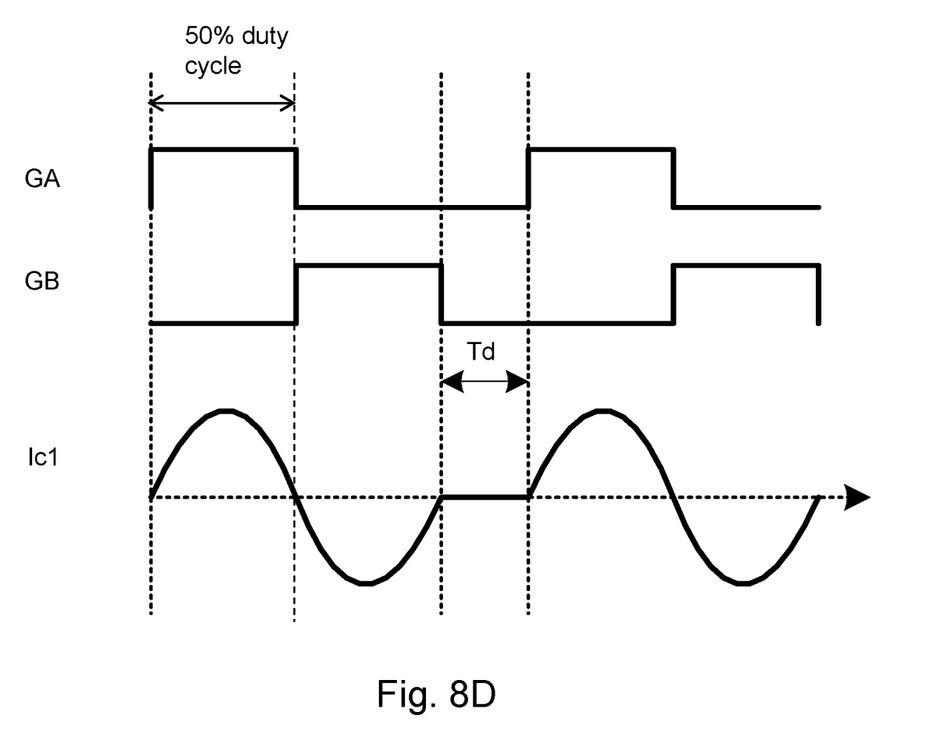
FIG. 8D illustrates a waveform diagram of operation signals and capacitor currents corresponding to a charging process and a discharging process of a resonant switched-capacitor converter of a two-stage power converter according to one embodiment of the present invention.

Please refer to FIGS. 8B-8C, which illustrate waveform diagrams of operation signals and inductor currents corresponding to a charging process and a discharging process of the resonant switched-capacitor converter of the two-stage power converter according to another embodiment of the present invention. Please refer to FIG. 4 along with FIG. 8B. In the embodiment shown in FIG. 8B, the charging operation signal GA corresponding to the switches Q1~Q4 is at high level in the charging process, whereas, the discharging operation signal GB corresponding to the switches Q5-Q10 is at high level in the discharging process. In the embodiment shown in FIG. 8B, the duration period of the charging process is substantially smaller than 50% of the cycle period by a predetermined period T1. Thus, after the switches Q1-Q4 have been turned OFF, a little amount of current remains, which flows through the charging inductor L1 to take away accumulated charges stored in a parasitic capacitor of the switch Q10 via the parasitic diode of the switch Q4, so that the voltage across the switch Q10 can be reduced, thus achieving soft switching. In one preferred embodiment, zero voltage switching can be achieved through adjusting the predetermined period T1. Please refer to FIG. 4 along with FIG. 8C. In the embodiment shown in FIG. 8C, the charging operation signal GA corresponding to the switches Q1-Q4 is at high level in the charging process, whereas, the discharging operation signal GB corresponding to the switches Q5-Q10 is at high level in the discharging process. In the embodiment shown in FIG. 8C, the duration period of the discharging process is substantially greater than 50% of the cycle period by a predetermined period T2. Thus, during the delayed turned-OFF period of the switches Q5-Q10, a negative current of the discharging inductor L2 will flow through a parasitic diode of the switch Q5, to charge a parasitic capacitor of the switch Q1. As a result, the voltage across the switch Q1 will be reduced, for achieving soft switching. In one preferred embodiment, zero voltage switching can be achieved through adjusting the predetermined period T2. It is noteworthy that, the embodiment of FIG. 8B and the embodiment of FIG. 8C can be implemented together or alone. Besides, please refer to FIG. 8D, which illustrates waveform diagrams of operation signals and capacitor currents corresponding to a charging process and a discharging process of the resonant switched-capacitor converter of the two-stage power converter according to another embodiment of the present invention. Please refer to FIG. 4 along with FIG. 8D. As shown in FIG. 8D, in this embodiment, the duration period of the charging process and/or the duration period of the discharging process can be adjusted. For example, a delayed interval Td can be added after the duration period of the charging process or the duration period of the discharging process. As such, this embodiment can more flexibly adjust the ratio of the input voltage Vin to the first stage voltage Vfs and therefore can adjust the resonant frequency.

The present invention provides a two-stage power converter as described above. Advantages of the present invention include: that the present invention can adjust the delay interval; that the present invention can adjust the resonant frequency of the resonant switched-capacitor converter and the switching frequency of the voltage regulator; that the present invention can reduce the resonant frequency of the resonant switched-capacitor converter and the switching frequency of the voltage regulator, to improve the efficiency at light load condition; that the present invention can synchronize the resonant frequency of the resonant switched-capacitor converter and the switching frequency of the voltage regulator, so as to enhance the EMI filtering performance; that the present invention can achieve soft-switching such as zero current switching (ZCS) or zero voltage switching (ZVS) to provide high power efficiency; that the present invention can flexibly adjust the voltage conversion ratio of the resonant switched-capacitor converter by setting proper control of the switches; that all resonant capacitors of the resonant switched-capacitor converter can have the same rated current and rated voltage, so that the present invention can support using capacitors with a smaller size; and that the present invention can lower voltage stress of the resonant switched-capacitor converter.

It is noteworthy that "high level" and "low level" mentioned in the above embodiments are only for illustration, not for limiting the scope of the present invention. In other embodiments, based on the type of switches and the required logic operation, the above-mentioned "high level" and "low level" may be modified as required, under the spirit of the present invention.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A two-stage power converter, which is configured to operably convert an input voltage to an output voltage, the two-stage power converter comprising:
    a resonant switched-capacitor converter (RSCC) configured to operably receive the input voltage and generate a first stage voltage;
    a voltage regulator configured to operably receive the first stage voltage and generate the output voltage; and
    a communication interface and control circuit configured to operably generate a charging operation signal, at least one discharging operation signal and a switching signal, wherein the charging operation signal and the at least one discharging operation signal are employed to control the RSCC, and the switching signal is employed to control the voltage regulator, so as to synchronize a resonant frequency of the RSCC and a switching frequency of the voltage regulator;
    wherein the RSCC includes:
        a plurality of capacitors;
        a plurality of switches coupled to the plurality of capacitors, the plurality of switches respectively switch electrical connections of the plurality of capacitors according to the corresponding charging operation signal or the corresponding discharging operation signal;
        at least one charging inductor connected in series to at least one of the plurality of capacitors; and
        at least one discharging inductor connected in series to at least one of the plurality of capacitors;
    wherein the charging operation signal and the at least one discharging operation signal have respective ON periods which do not overlap with one another, such that a charging process and at least one discharging process do not overlap with one another;
    wherein in the charging process, the switches are controlled by the charging operation signal such that a series connection of the plurality of capacitors and the at least one charging inductor is formed between the input voltage and the first stage voltage, which forms a charging path;
    wherein in the at least one discharging process, the switches are controlled by the at least one discharging operation signal such that each of the capacitors and a corresponding one of the at least one discharging inductor form a series connection between the first stage voltage and a ground voltage level, whereby a plurality of discharging paths are formed at a same time or in alternating order;
    wherein the charging process and the at least one discharging process are arranged in a repeated, alternating manner, so as to convert the input voltage to the first stage voltage;
    wherein the communication interface and control circuit adjusts a delay interval after the at least one discharging process ends, and starts the charging process at an end time point of the delay interval, wherein the plurality of switches are OFF during the delay interval.

2. The two-stage power converter of claim 1, wherein the communication interface and control circuit adjusts the delay interval, so as to adjust the resonant frequency of the RSCC.

3. The two-stage power converter of claim 1, further comprising a power supply unit configured to operably provide the input voltage.

4. The two-stage power converter of claim 1, wherein the output voltage is employed to supply power to a central processing unit, a graphics processing unit or a memory unit, and the communication interface and control circuit is configured to adjust the charging operation signal, the at least one discharging operation signal and the switching signal, so as to adjust a ratio of the input voltage to the first stage voltage.

5. The two-stage power converter of claim 1, wherein the at least one charging inductor is one single charging inductor, and the at least one discharging inductor is one single discharging inductor.

6. The two-stage power converter of claim 5, wherein an inductance of the single charging inductor is equal to an inductance of the single discharging inductor.

7. The two-stage power converter of claim 1, wherein the at least one charging inductor and the at least one discharging inductor are one same single inductor.

8. The two-stage power converter of claim 7, wherein the same single inductor is a variable inductor.

9. The two-stage power converter of claim 1, wherein the charging process has a charging resonant frequency, whereas, the at least one discharging process has a discharging resonant frequency, and wherein the charging resonant frequency is identical to the discharging resonant frequency.

10. The two-stage power converter of claim 1, wherein the charging process has a charging resonant frequency, whereas, the at least one discharging process has a discharging resonant frequency, and wherein the charging resonant frequency is different from the discharging resonant frequency.

11. The two-stage power converter of claim 1, wherein a duration period of the charging process is adjustable to achieve zero voltage switching.

12. The two-stage power converter of claim 1, wherein a duration period of the at least one discharging process is adjustable to achieve zero voltage switching.

13. The two-stage power converter of claim 1, wherein the resonant switched-capacitor converter is a bidirectional resonant switched-capacitor converter.

14. The two-stage power converter of claim 1, wherein a voltage conversion ratio of the input voltage to the first stage voltage of the resonant switched-capacitor converter is 4:1, 3:1 or 2:1.

* * * * *